March 6, 1962 W. E. GREENE 3,023,797
INTERRUPTED THREAD BOLT AND BUSHING WITH STOP
AND RADIALLY SLIDING LOCK MEANS
Filed March 9, 1959 2 Sheets-Sheet 1
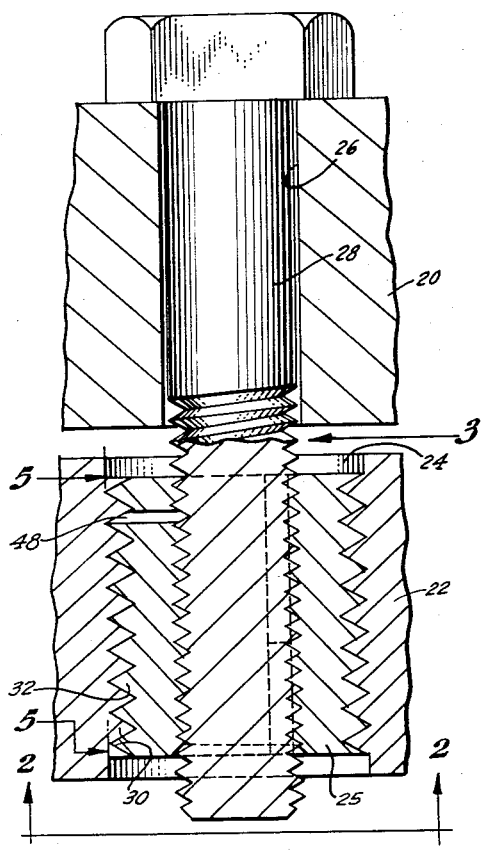
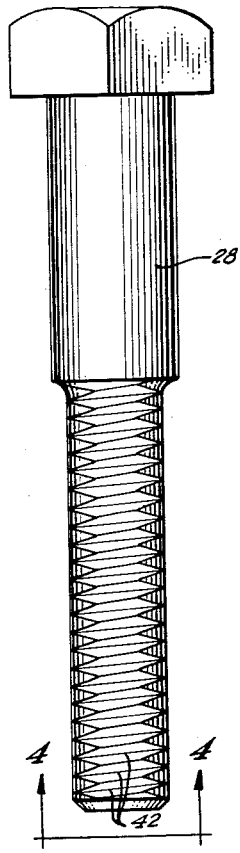
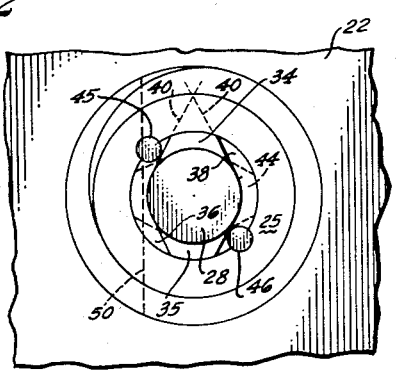
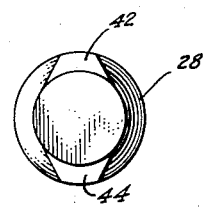
INVENTOR:
Whitney E. Greene March 6, 1962  W. E. GREENE  3,023,797
INTERRUPTED THREAD BOLT AND BUSHING WITH STOP
AND RADIALLY SLIDING LOCK MEANS
Filed March 9, 1959  2 Sheets-Sheet 2
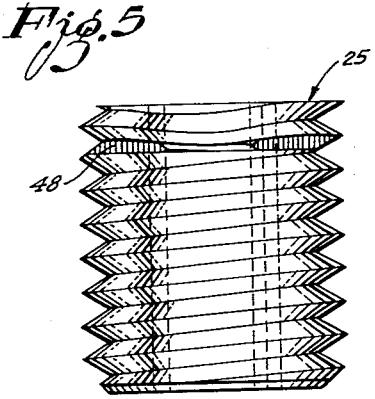
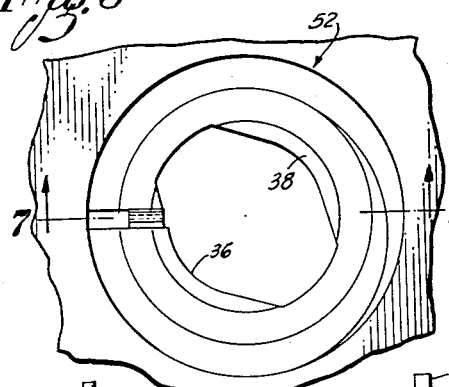
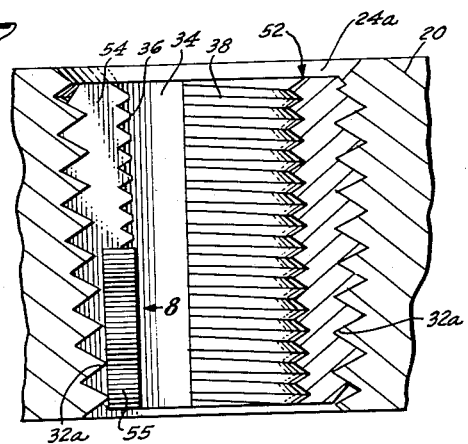
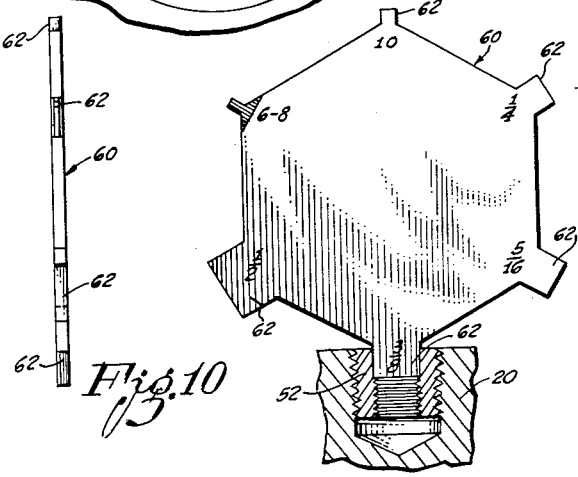
INVENTOR:
Whitney E. Greene
Attorneys

United States Patent Office 3,023,797
Patented Mar. 6, 1962

3,023,797
INTERRUPTED THREAD BOLT AND BUSHING WITH STOP AND RADIALLY SLIDING LOCK MEANS
Whitney E. Greene, 712 S. Wilton Place, Los Angeles, Calif.
Filed Mar. 9, 1959, Ser. No. 797,923
4 Claims. (Cl. 151—24)

This invention relates to screw threaded fastening means and, more particularly, relates to a fastening assembly comprising a screw member and a threaded insert bushing for cooperation therewith. The fastening assembly is used, for example, to anchor an object to a body, the insert bushing of the assembly being threaded into a threaded bore in the body and the screw member being threaded into the insert bushing and extending through an aperture or bore in the object.

A primary problem to which the invention is directed is to provide such a fastening assembly of high strength and complete reliability that may be quickly connected and quickly disconnected. There are many instances where the use of such a quick disconnect fastening means may save substantial time and labor in the periodic inspection and servicing of equipment. Much time is lost, for example, in manipulating screws and nuts for removing and replacing cylinder heads, casing heads, inspection plates and closures of various kinds for access to permit inspection, servicing, repairing and replacing of working parts.

The invention meets this problem by providing an insert bushing and a cooperating screw fastening member so shaped that the screw member may be installed in the insert in the same general manner that a conventional key is applied to a lock. Thus the screw member may be moved longitudinally into the insert bushing to the desired extent without rotation and then may be rotated through less than a complete revolution to a desired installed position in interlocking engagement with the insert bushing. Conversely, the installed interlocked screw member may be removed by first rotating the screw member to a release position and then simply withdrawing the screw member longitudinally without further rotation.

To carry out this concept, a plurality of longitudinal grooves are cut through the internal screw thread of the insert bushing to form longitudinal rows of segments of turns of the internal screw thread of the bushing, thus forming an insert passage of noncircular configuration. The external screw thread of the screw member is cut away to give the screw member the same cross-sectional configuration as this passage and to form corresponding longitudinal rows of segments of turns of the outer screw thread of the screw member.

By virtue of these configurations, the screw member may be quickly thrust into the insert bushing to a desired extent and then rotated less than one revolution to cause the screw thread segments of the screw member to interlock with the corresponding screw thread segments of the insert bushing. Suitable stop means is mounted inside the insert bushing longitudinally thereof for abutment against the screw member laterally thereof at what may be termed the locking position of the screw member relative to the insert bushing where the screw thread segments of the screw member and bushing are effectively engaged with each other.

A feature of the invention that is important in many instances is that it avoids the necessity of using any special tool or fitting to install the insert bushing. The insert bushing may be installed by means of an ordinary screw driver or may be installed by first mounting the insert bushing on the associated screw member and then using the screw member itself as a tool to screw the insert bushing into the threaded bore.

It is possible to use a conventional screw member of the prior art in this manner for installing various insert bushings of the prior art but it is necessary to use a temporary lock nut on the conventional screw member in abutment with the insert bushing to lock the screw member and insert bushing together against relative rotation while the screw member is serving as a tool. The present invention, however, makes it unnecessary to use a temporary lock nut for this purpose and also makes it unnecessary to take time to screw the screw member tediously into the insert bushing and later to unscrew the screw member for the purpose of removing the temporary lock nut. In the present invention, the screw member may be quickly engaged with the insert bushing in a non-rotatable manner for installing the insert bushing and thereafter the screw member may be just as quickly disengaged.

There are certain inherent disadvantages that would ordinarily be expected in an arrangement as described where an internal screw thread of one member is grooved to form screw thread segments and a screw member is correspondingly shaped with screw thread segments. One of these disadvantages is that after the screw member is inserted longitudinally for rotation, only a fraction of one revolution is available for tightening action to load the screw member under tension, and this short range of screw action may be insufficient to accomplish the required magnitude of tension. On the other hand, the desired tightness of the screw member may require less than the available range of screw action in which event the screw thread segments of the screw member may only partially overlap the cooperating screw thread segments to provide less than the full available strength.

The present invention makes it possible to avoid both of these disadvantages. For example, when a screw member is thrust into an insert bushing and rotated to its locking position relative to the bushing, further screw action for increasing tensioning of the screw member may be accomplished simply by continuing to rotate the screw member in the tightening direction with consequent rotation of the insert bushing in the threaded bore in which it is mounted. Thus, the insert bushing provides the desired increased tightening of the screw member. On the other hand, if it is found that the desired degree of tensioning of the screw member is reached with the screw member only partially rotated to its locking position relative to the bushing, it is a simple matter to rotate the screw member in the reverse direction to a position where the screw member acting against the stop means in the bushing causes the bushing to be unscrewed to a slight degree. With this loosening adjustment of the insert bushing in the threaded bore in which it is mounted, the screw member may then be tightened again to full locking engagement with the insert bushing without excessive tensioning of the screw member.

The various features and advantages of the invention may be readily understood from the following description considered with the accompanying drawings.

In the drawings, which are to be regarded as merely illustrative:

FIG. 1 is a longitudinal sectional view of a selected embodiment of the invention showing how a screw member in the form of a bolt cooperates with an insert bushing in a threaded bore of a body to anchor an object to the body;

FIG. 2 is a bottom view as seen along the line 2—2 of FIG. 1;

FIG. 3 is a side elevation of the bolt as viewed in the direction of the arrow 3 in FIG. 1;

FIG. 4 is an end elevation of the bolt as seen along the line 4—4 of FIG. 3;

FIG. 5 is a side elevation of the insert bushing prior to installation as seen along the line 5—5 of FIG. 1;

FIG. 6 is a plan view of a second embodiment of the insert bushing showing the insert bushing installed in a threaded bore of a body;

FIG. 7 is a longitudinal section of the second embodiment of the bushing taken as indicated by the line 7—7 of FIG. 6;

FIG. 8 is a side elevation of an undulating spring member employed in this second bushing, the spring member being viewed in the direction of the arrow 8 in FIG. 7;

FIG. 9 is a view partly in side elevation and partly in section showing a special flat tool that may be used to install an insert bushing; and FIG. 10 is an edgewise view of the flat tool shown in FIG. 9.

With reference to FIGS. 1 to 5 illustrating the first embodiment of the invention, FIG. 1 shows how the teachings of the invention may be applied to the attachment of an object 20 to a body 22. For this purpose, the body 22 is provided with a threaded bore 24 to receive an insert bushing 25 and the object 20 is provided with an aperture or bore 26 to receive a screw member in the form of a bolt 28 that threads into the insert bushing. The bore 24 is tapped to form a suitable internal screw thread 30 and the insert bushing is formed with a corresponding external screw thread 32.

The insert bushing 25 is formed with an internal screw thread and, in accord with the inventive concept, a plurality of longitudinal grooves are cut through the turns of this internal screw thread to form circumferentially spaced longitudinal rows of inner screw thread segments. In this particular practice of the invention, there are two diametrically opposite longitudinal grooves 34 and 35 inside the insert bushing 25 and the removal of the material to provide the grooves forms two diametrically opposite longitudinal rows of segments comprising a first row of segments 36 and a second row of segments 38. It is apparent that the provision of the two longitudinal grooves 34 and 35 results in the formation of a noncircular axial passage in the insert bushing 25.

In the construction shown, the side walls of the longitudinal grooves 34 and 35 are convergent and in this instance the planes of the convergent side walls meet at an angle of approximately 60°, as indicated by the two dotted lines 40 in FIG. 2. It is contemplated that this angle will be approximately within the range of 30° to 60°.

The threaded portion of the shank of the bolt 28 is formed to the same noncircular cross-sectional configuration as the passage into the insert bushing 25. Thus as indicated in FIGS. 3 and 4, portions on opposite sides of the threaded bolt shank are ground away to form two diametrically opposite longitudinal rows of segments of the turns of the external screw thread, there being one longitudinal row of external segments 42 and a second longitudinal row of external segments 44.

It is apparent that the threaded portion of the shank of the bolt 28 may be thrust longitudinally into the insert bushing 25 to any extent desired, for example all the way through the bushing, as shown in FIG. 1, and then the bolt may be rotated through a fraction of a revolution to a locking position with respect to the bushing. At this locking position of the bolt 28 relative to the insert bushing 25, the external screw thread segments 42 of the bolt engage the corresponding internal screw thread segments 36 of the bushing and the external screw thread segments 44 of the bolt engage the internal screw thread segments 38 of the bushing.

As heretofore indicated, the invention further requires stop means inside the insert bushing 25 to limit rotation in one direction of the bolt relative to the bushing when the bolt is in its locked position. For this purpose, this first embodiment of the invention shows two pins 45 and 46 mounted inside the bushing 25 adjacent the two grooves 34 and 35 respectively. These pins 45 and 46 are positioned in the path of rotation of the bolt 28 and, therefore, extend into the radial zone of the internal screw thread segments 36 and 38, i.e., extend into the radial zone defined by the minor and major diameters of the internal screw thread segments of the insert.

In this embodiment of the invention, there are two pins 45 and 46 to serve as two stop members for simultaneous contact with opposite sides of the bolt 28, but it is to be understood that one of the two pins may be omitted. The two pins 45 and 46 may be mounted inside the insert in any suitable manner. In this instance, the material of the internal screw thread segments 36 and 38 of the insert 25 is cut away to provide longitudinal seats for the two stop pins and the stop pins are furnace-brazed in the seats.

The manner in which this first embodiment of the invention serves its purpose may be readily understood from the foregoing description. In preparation for securing the object 20 to the body 22, the threaded bore 24 is formed in the body. The insert bushing 25 is then installed in the threaded bore 24. The bolt 28 is then passed through the aperture 26 in the object 20 and is thrust axially into the insert bushing 25, for example to the extent shown in FIG. 1. The bolt 28 is then rotated in the tightening direction approximately 90° to the locking position shown in FIGS. 1 and 2. At this locking position, the two rows of external screw thread segments 42 and 44 of the bolt abut the two diametrically opposite stop means 45 and 46.

It is apparent that when the bolt 28 is rotated relative to the insert bushing 25 after the bolt is thrust without rotation into the bushing, the screw thread segments of the bolt cooperate with the corresponding screw thread segments of the bushing for screw action to place the bolt under tension. This screw action may not be sufficient to place the bolt under the desired degree of tension. It is a simple matter, however, to continue the tightening rotation of the bolt 28 against the stop pins 45 and 46 thereby to cause the insert bushing 25 to rotate in the threaded bore 24 of the body 22 to tighten the bolt.

On the other hand, the screw action involved in the slight rotation of the bolt from its free position to its locking position may tighten the bolt to a greater degree than desired. In that event, it is a simple matter to loosen the insert slightly by slight reverse rotation of the bolt against the stop pins 45 and 46 and then to rotate the bolt back to its locking position.

The bolt 28 may be quickly removed from the insert bushing 25 to release the object 20 from the body 22. For this purpose, it is merely necessary to rotate the bolt in a loosening direction less than one revolution to orient the noncircular cross-sectional configuration of the bolt with the noncircular configuration of the axial passage in the bushing. This slight degree of rotation loosens the bolt by disengaging screw thread segments of the bolt from the screw thread segments of the insert. The bolt may then be simply pulled axially out of the insert.

It is apparent that the resistance of the insert bushing 25 to rotation in the threaded bore 24 of the body 22 must exceed the resistance to rotation of the bolt 28 relative to the bushing 25. Since the external screw thread of the insert bushing is much greater in diameter than the internal screw thread of the bushing, there is obviously a leverage advantage which makes the bushing tend to remain stationary in the body 22 when the bolt 28 is rotated relative to the insert. This tendency is vastly increased by the fact that large portions of the internal screw thread of the bushing as well as large portions of the external screw thread of the bolt are cut away.

In some instances, however, it may be desirable to resort to some expedient to provide even more resistance to rotation of the installed bushing. For example, a lateral slot 48 may be cut in one side of the insert bushing near one of its ends as shown in FIGS. 1 and 5, the depth of the slot being indicated by the dotted line 50 in FIG. 2. After this slot 48 is cut in the bushing 25, the corresponding end of the bushing is tapped with a hammer to distort the end of the bushing in the manner indicated in FIG. 5 to cause the central portion of the slot 48 to be narrowed. When the slotted and distorted insert bushing is screwed into the threaded bore 24, the internal screw thread 32 of the bore forces the distorted bushing back to its original configuration with consequent increase in the frictional engagement between the internal screw thread 32 of the threaded bore and the external screw thread 30 of the bushing.

FIGS. 6, 7 and 8 illustrate the manner in which a second form of an insert bushing may be used to cooperate with the previously described bolt 28.

This second insert bushing, which is generally designated 52, is largely similar to the first described insert bushing, as indicated by the use of corresponding numerals to designate corresponding parts. The insert bushing 52 differs from the first described insert bushing 25, first, in being of tapered configuration to fit into a correspondingly tapered bore 24a in the body 20 and, second, in being of longitudinally split construction to provide a longitudinal slot 54 to receive means such as a leaf spring element 55 of wavy or undulating configuration.

The tapered configuration of the insert bushing 52 tends to increase its frictional engagement with the surrounding screw thread 32a of the body 20 and thus increases the resistance to loosening rotation of the insert bushing relative to the body. The longitudinal slot 54 that splits the bushing is formed by removing material, for example, by a milling operation and thus makes the bushing capable of diametrical contraction as well as diametrical expansion. The undulating leaf spring 55 makes contact with both of the two opposite walls of the slot 54 and thereby resists contraction of the insert. Thus, the undulating leaf spring 55 cooperates in the development of the frictional engagement of the insert bushing with the body 20.

The second form of insert bushing shown in FIGS. 6 and 7 also differs from the first described form in the omission of the previously mentioned stop pins 45 and 46. The omission of the stop pins is made possible by the fact that the leaf spring element 55 may be dimensioned in width to serve as a stop member. Thus, as shown in FIGS. 6 and 7, the leaf spring element 55 is wide enough for one side edge of the leaf spring to abut the internal screw thread 32a of the bore 24a with the other side edge extending into the radial zone defined by the major and minor diameters of the internal screw thread segments 36 and 38 of the insert bushing.

An important advantage of the second practice of the invention is that the leaf spring element 55 tends to be cammed radially outward by the bolt when the bolt is placed under torque with the torque opposed by the leaf spring element. Thus, the leaf spring element makes positive engagement with the material of the body 20 to provide additional resistance to loosening rotation of the bushing.

It is apparent that the undulating leaf spring 55 has four functional relationships with associated structure. In the first place, it functions as yielding means to resist narrowing of the slot 54 and thereby resists wedging contraction of the insert bushing. In the second place, the undulating leaf spring frictionally engages the opposite walls of the slot 54 to prevent separation of the leaf spring from the insert bushing when the insert bushing is handled prior to its ultimate installation. In the third place, the leaf spring functions as a stop means to limit rotation of the bolt 28 in one rotary direction relative to the insert bushing 52 when the bolt is in its locked position relative to the insert bushing. In the fourth place, the camming action of the bolt on the leaf spring causes the leaf spring to deform the surrounding screw thread 32a of the bore 24a for positively locking the insert bushing against loosening rotation in the bore.

Usually the insert bushing of the invention will be made of metal. There are some instances, however, in which it is advantageous to make the insert bushing of other materials. Thus an insert bushing of the invention may be made of nylon, or may be made of a phenolic resin or of a suitable plastic reinforced with glass fibers.

Since the axial passage in an insert bushing of the invention is noncircular, any suitable tool such as a screw driver may be inserted therein for the purpose of screwing the insert into the threaded bore of a body. FIGS 9 and 10 show how a tool for this purpose may be cut from plate stock. As shown in FIG. 9, the tool, which is generally designated 60, has a series of radial projections or tongues 62 to fit into insert bushings of various sizes. One of these radial projections 62 is shown inserted into a tapered insert bushing 52 for the purpose of screwing the insert bushing into a threaded bore in a body 20.

As heretofore stated, a feature of the invention is that the bolt 28 may also be used as a tool for screwing an insert bushing into a threaded bore of a body. Thus it is a simple matter to insert the bolt 28 quickly into an insert bushing and then use a wrench to rotate the bolt and thereby rotate the insert bushing.

My description in specific detail of the selected practices of the invention will suggest various changes, substitutions and other departures from my disclosure within the spirit and scope of the appended claims.

I claim:

1. A quick disconnect means for releasably fastening an object to a body that has a threaded bore, comprising: an insert bushing having an external screw thread to engage the internal screw thread of said bore, the interior of said bushing being formed with a plurality of longitudinal rows of segments of turns of an internal screw thread with longitudinal grooves separating said rows from each other; said bushing being split by a longitudinal slot to permit diametrical expansion and contraction of the bushing; a screw fastening member having a noncircular cross-sectional configuration complementary to the noncircular internal cross section of said insert to permit the fastening member to be moved longitudinally without rotation into the interior of the bushing, said screw member having a plurality of longitudinal rows of segments of turns of an external screw thread dimensioned to pass through said grooves, said external segments of said screw member corresponding with said internal segments of said bushing for engagement therewith whereby the screw member may be aligned with and oriented with said longitudinal passage, moved longitudinally into the passage without rotation, and may then be rotated less than one revolution to a locking position with said external thread of the screw member in threaded engagement with said internal screw thread of the bushing and may be removed from its locking position by reverse rotation of less than one revolution followed by withdrawal without rotation; and an elongated leaf spring member of undulating configuration mounted in said slot to urge the opposite walls of the slot apart for creating frictional resistance to removal of the bushing from said bore, said leaf spring member extending into the radial region of said screw thread segments of the bushing to serve as stop means to engage said segments of the screw member to limit rotation of the screw member relative to the bushing at said locking position and to transmit rotation from the screw member to the bushing for rotation of the bushing in said threaded bore of the body.

2. A combination as set forth in claim 1 in which said insert bushing is externally tapered for wedging fit in said threaded bore to resist loosening rotation of the bushing.

3. A quick disconnect means for releasably fastening an object to a body that has a threaded bore, comprising: an insert bushing having an external screw thread to engage the internal screw thread of said bore, the interior of said bushing being formed with a plurality of longitudinal rows of segments of turns of an internal screw thread with longitudinal grooves separating said rows from each other, said bushing having a longitudinal slot through its wall extending over at least a portion of its length; a screw fastening member having a noncircular cross-sectional configuration complementary to the noncircular internal cross section of said insert to permit the fastening member to be moved longitudinally without rotation into the interior of the bushing, said screw member having a plurality of longitudinal rows of segments of turns of an external screw thread dimensioned to pass through said grooves, said segments being radially tapered to form cam surfaces, said external segments of said screw member corresponding with said internal segments of said bushing for engagement therewith whereby the screw member may be aligned with and oriented with said longitudinal passage, moved longitudinally into the passage without rotation, and may then be rotated less than one revolution to a locking position with said external thread of the screw member in threaded engagement with said internal screw thread of the bushing and may be removed from its locking position by reverse rotation of less than one revolution followed by withdrawal without rotation; and an elongated member slidably mounted in said slot to serve as stop means to engage said cam surfaces of the segments of the screw member to limit rotation of the screw member relative to the bushing at said locking position of the screw member and to transmit rotation from the screw member to the bushing for rotation of the bushing in said threaded bore of the body, said elongated member being of a width to extend from the radial region of said external screw thread of the bushing to the radial region of said internal screw thread segments of the bushing whereby tightening rotation of said screw member at its locking position causes said cam surfaces to urge said elongated member radially outward into engagement with the surrounding wall of said threaded bore to lock the bushing against loosening rotation in the bore.

4. A combination as set forth in claim 3 in which said elongated member is a leaf spring of undulating configuration.

References Cited in the file of this patent

UNITED STATES PATENTS

| | | |
|---|---|---|
| 1,442,500 | Van Dyke | Jan. 16, 1923 |
| 1,451,970 | Taylor | Apr. 17, 1923 |
| 1,652,169 | Fleming | Dec. 13, 1927 |
| 1,849,240 | McCrudden | Mar. 15, 1932 |
| 2,374,690 | Lane | May 1, 1945 |
| 2,757,429 | Summers | Aug. 7, 1956 |
| 2,914,106 | Boyd | Nov. 24, 1959 |
| 2,922,211 | Boyd | Jan. 26, 1960 |
| 2,936,014 | Kraus | May 10, 1960 |

FOREIGN PATENTS

| | | |
|---|---|---|
| 655,055 | France | Dec. 8, 1928 |
| 692,041 | Great Britain | May 27, 1953 |
| 1,155,930 | France | Dec. 9, 1957 |
| 1,178,359 | France | Dec. 8, 1958 |